United States Patent
Hiddema (10) Patent No.: US 9,301,516 B2
(45) Date of Patent: Apr. 5, 2016

(54) PUMP SYSTEM AND AGRICULTURAL SPRAYER PUMP SYSTEM

(71) Applicant: AGCO Netherlands B.V., Hesston, KS (US)

(72) Inventor: Joris Jan Hiddema, Grubbenvorst (NL)

(73) Assignee: AGCO Netherlands B.V, Grubbenvorst (NL)

( * ) Notice: Subject to any disclaimer, the term of this patent is extended or adjusted under 35 U.S.C. 154(b) by 0 days.

(21) Appl. No.: 14/561,423

(22) Filed: Dec. 5, 2014

(65) Prior Publication Data

US 2015/0157004 A1 Jun. 11, 2015

(30) Foreign Application Priority Data

Dec. 5, 2013 (GB) .................................. 1321491.1

(51) Int. Cl.
| | |
|---|---|
| *B05B 1/20* | (2006.01) |
| *A01M 7/00* | (2006.01) |
| *B05B 12/14* | (2006.01) |
| *F04D 15/00* | (2006.01) |
| *F16K 11/087* | (2006.01) |
| *F16K 27/06* | (2006.01) |
| *F04D 29/42* | (2006.01) |
| *F04D 29/02* | (2006.01) |
| *A01C 23/04* | (2006.01) |

(52) U.S. Cl.
CPC .............. *A01M 7/005* (2013.01); *A01C 23/047* (2013.01); *A01M 7/00* (2013.01); *B05B 12/14* (2013.01); *F04D 15/0016* (2013.01); *F04D 29/026* (2013.01); *F04D 29/4293* (2013.01); *F16K 11/0873* (2013.01); *F16K 27/067* (2013.01); *Y10T 137/4259* (2015.04); *Y10T 137/794* (2015.04); *Y10T 137/85986* (2015.04); *Y10T 137/86027* (2015.04)

(58) Field of Classification Search
CPC ......... B05B 1/08; B05B 1/083; A01M 7/005; A01C 23/047; A01C 23/04
USPC ....................... 239/159, 172, 337, 569, 581.1
See application file for complete search history.

(56) References Cited

U.S. PATENT DOCUMENTS

| | | | | |
|---|---|---|---|---|
| 5,887,390 | A * | 3/1999 | Schulz ................ | A01M 7/0075 212/245 |
| 7,152,812 | B1 * | 12/2006 | Johnson .............. | A01M 7/0039 239/159 |
| 8,777,125 | B2 * | 7/2014 | Honermann ........... | A01M 7/00 137/343 |
| 2002/0030119 | A1 * | 3/2002 | Proharam ............ | A01C 23/042 239/168 |
| 2013/0206278 | A1 | 8/2013 | Ballu | |

FOREIGN PATENT DOCUMENTS

GB 591936 A 9/1947

OTHER PUBLICATIONS

Intellectual Property Office, International Search Report Prepared for UK Application No. GB1321491.1, dated Jul. 22, 2014.

* cited by examiner

*Primary Examiner* — Davis Hwu (57) ABSTRACT

An agricultural sprayer comprises a pump system for conveying and distributing fluid between fluid sources and consumers. The pump system comprises a centrifugal pump and a multi-inlet ball valve located on a suction side of the pump. The centrifugal pump comprises an impeller that rotates on a pump axis. The ball valve comprises a ball that is rotatable around the pump axis to selectively connect the valve inlets to the pump. The pump comprises a pump casing that is provided together with a portion of a ball valve casing by a unitary casting.

15 Claims, 9 Drawing Sheets

PUMP SYSTEM AND AGRICULTURAL SPRAYER PUMP SYSTEM

BACKGROUND OF THE INVENTION

1. Field of Invention

The invention relates to pump systems for agricultural sprayers which serve to distribute fluid between various fluid sources and consumers including tanks, water supplies and spray booms.

2. Description of Related Art

Agricultural sprayers are employed by farmers and contractors alike to apply to a crop field pesticides and/or nutrients in the form of liquid solutions. A sprayer typically comprises a main tank for storing the liquid to be applied and a plurality of liquid application nozzles arranged along a boom, the boom extending in a direction transverse to the forward direction of travel. An on-board pump system serves to pump the fluid from the tank to the nozzles during operation.

In addition to the main tank and spray nozzles, the pump system may also serve to convey fluid between other sources and consumers. For example, in a fill mode, the pump may drive water from an external source to the main tank. In a recirculation mode the pump may take pesticide solution from the bottom of the tank and inject it back in at the top. In a cleaning mode, clean water from a clean water tank may be passed through the pipework and sprayed into the main tank.

The overall pump system may, therefore, include a multitude of components including valves, filters, joints and pipes spread over the vehicle thus demanding complex pipe networks and valve arrangements. The complex arrangements present many corners and "dead spots" where chemicals can become trapped making it difficult to clean. There is thus a desire to simplify the pump systems and, in turn, reduce complexity and manufacturing cost.

SUMMARY OF INVENTION

It is an object of the invention to provide a pump system for an agricultural sprayer which employs fewer components.

It is another object of the invention to provide a more compact pump system for an agricultural sprayer.

It is a further object of the invention to provide a more energy-efficient pump system for an agricultural sprayer.

It is yet a further object of the invention to provide an agricultural sprayer that is designed more ergonomically for the operator.

In accordance with the invention there is provided an agricultural sprayer comprising a pump system for conveying and distributing fluid between fluid sources and consumers, the pump system comprising a centrifugal pump and a multi-inlet ball valve located on a suction side of the pump, the centrifugal pump comprising an impeller that rotates on a pump axis, the ball valve comprising a ball that is rotatable around the pump axis to selectively connect the valve inlets to the pump, wherein the pump comprises a pump casing that is provided together with a portion of a ball valve casing by a unitary casting.

It should be understood that a centrifugal pump has both a suction side from which fluid is drawn, and a pressure side to which fluid is ejected.

By integrating a portion of the suction side ball valve casing with the pump casing in a unitary casting a number of benefits are provided. Firstly, the number of components required to form the suction side distribution valve and the pump is reduced thereby saving cost in manufacture. Secondly, the suction side distribution valve is located immediately up-stream of the pump thereby providing a more compact arrangement. Thirdly, the close proximity of the ball valve to the pump impellor delivers a more efficient fluid flow as the fluid enters the pump housing along the rotation axis of the impellor. Fourthly, the plumbing is easier to rinse because the number of corners and disturbances is reduced.

The pump system preferably comprises a suction side manifold in sealing connection with said portion of the ball valve casing. The suction side manifold provides a further portion of the ball valve casing and comprises a number of inlet pipes that correspond to the valve inlet ports and which align with a bore provided in the ball of the valve. The suction side manifold may be formed from a single casting thereby saving further cost and component numbers. Together with the casting of the pump housing, the suction side manifold provides a casing for the ball valve together with pipe connections for the inlet ports. The valve bore is preferably of a bent L-shape to place a selected one of the inlet ports and the suction side of the pump into fluid communication.

The pump system may further comprise a filter housing mounted to the centrifugal pump, the filter housing having an inlet plumbed to a coupling device for attaching a filler hose, and an outlet plumbed to a first one of said plurality of inlet pipes of the suction side manifold. The filter housing may be associated with a filling line which is, advantageously, provided in the vicinity of the pump making for a more compact system. The suction side manifold provides a direct connection from the suction side distribution valve to the filler line filter without the need for additional pipework. Not only does this reduce the number of components required but a more robust arrangement is provided.

The sprayer may comprise an operator work station having a console which includes an access opening to the filter housing for the operator to replace filter element. By providing the filter housing under the console the ergonomics of routine replacement of the filter are improved.

As mentioned above, the suction side distribution valve ball valve has a plurality of positions, each position having a corresponding inlet pipe provided by the suction side manifold. These pipes may be plumbed to one or more fluid sources on the sprayer including, by way of example, a main fluid storage tank, an auxiliary clean water tank, and a return line from a boom having one or more nozzles. The ball of the ball valve is rotated to a selected position to direct one of the inlets to the pump.

The pump system preferably comprises an electric actuator mounted to the suction side manifold and arranged to control rotation of the ball valve ball. However, manual operation of the valve is also envisaged.

On the pressure side of the pump, the pump system may comprise a multi-outlet ball valve in a similar manner to that described above. The pressure side ball valve may comprise a ball that is rotatable to selectively connect one of a plurality of valve outlet ports to the pump, wherein the unitary casting of the pump housing includes also a portion of a casing of the pressure side ball valve. In this case the unitary casting may provide the pump casing together with respective portions of the pressure side ball valve casing and the suction side ball valve casing.

A multi outlet pressure side manifold may be provided in sealing connection with said portion of the pressure side ball valve casing and may comprise a number of outlet pipes that correspond to the valve outlet ports and which align with a bore provided in the ball of the valve.

The outlet pipes may be connected to one or more fluid consumers on the sprayer including, by way of example, the nozzles of the spray boom, the main storage tank, the clean water tank, and an unloading hose connection. A pressure side filter may be provided having a housing mounted to the centrifugal pump wherein the filter housing has an inlet plumbed to one of said plurality of outlet pipes of the pressure side manifold. Advantageously, the pressure side filter is provided in the vicinity of the pump making for a more compact arrangement.

BRIEF DESCRIPTION OF DRAWINGS

Further advantages of the invention will become apparent from reading the description of specific embodiments with reference to the appended drawings in which:—

DETAILED DESCRIPTION

Figure 1:
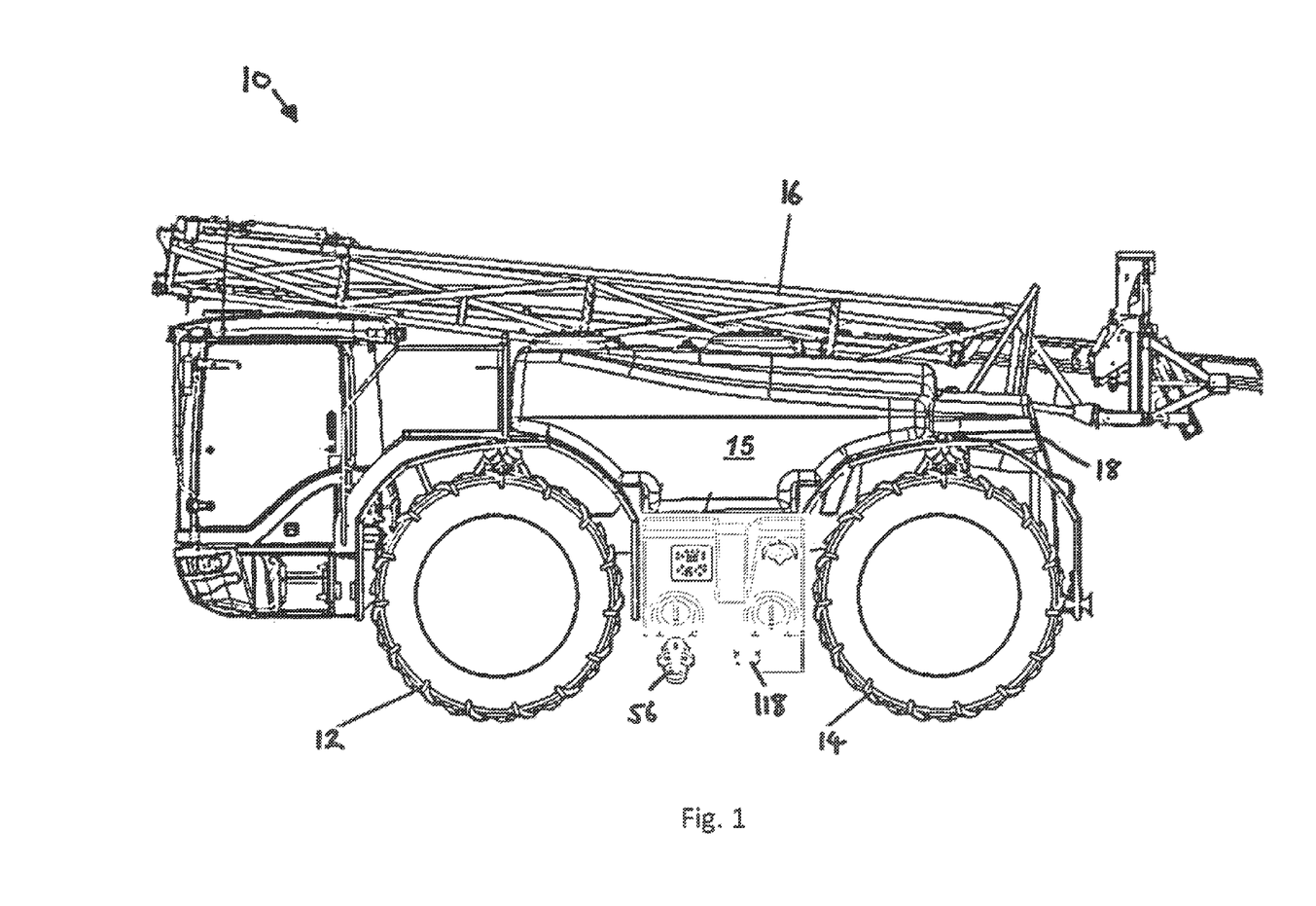
FIG. 1 is a side view of an agricultural sprayer fitted with a pump system in accordance with the invention.

With reference to FIG. 1 a self-propelled agricultural sprayer 10 comprises front wheels 12 and rear wheels 14. An on-board main storage tank 15 serves to store the pesticide or nutrient solution for application to the field. A spray boom 16 (shown in a folded state) extends transversely relative to the forward direction of travel and includes a number of spray nozzles for applying the solution. An auxiliary, clean water, tank 18 is also provided for storing a volume of clean water which is used to rinse the plumbing and main tank 15 after the spraying operation.

Although a self-propelled application machine is shown and described hereinafter, it should be understood that the embodied invention is applicable to other agricultural sprayers including pull-type (towed) sprayers and (3-point linkage) mounted sprayers.

Figure 2:
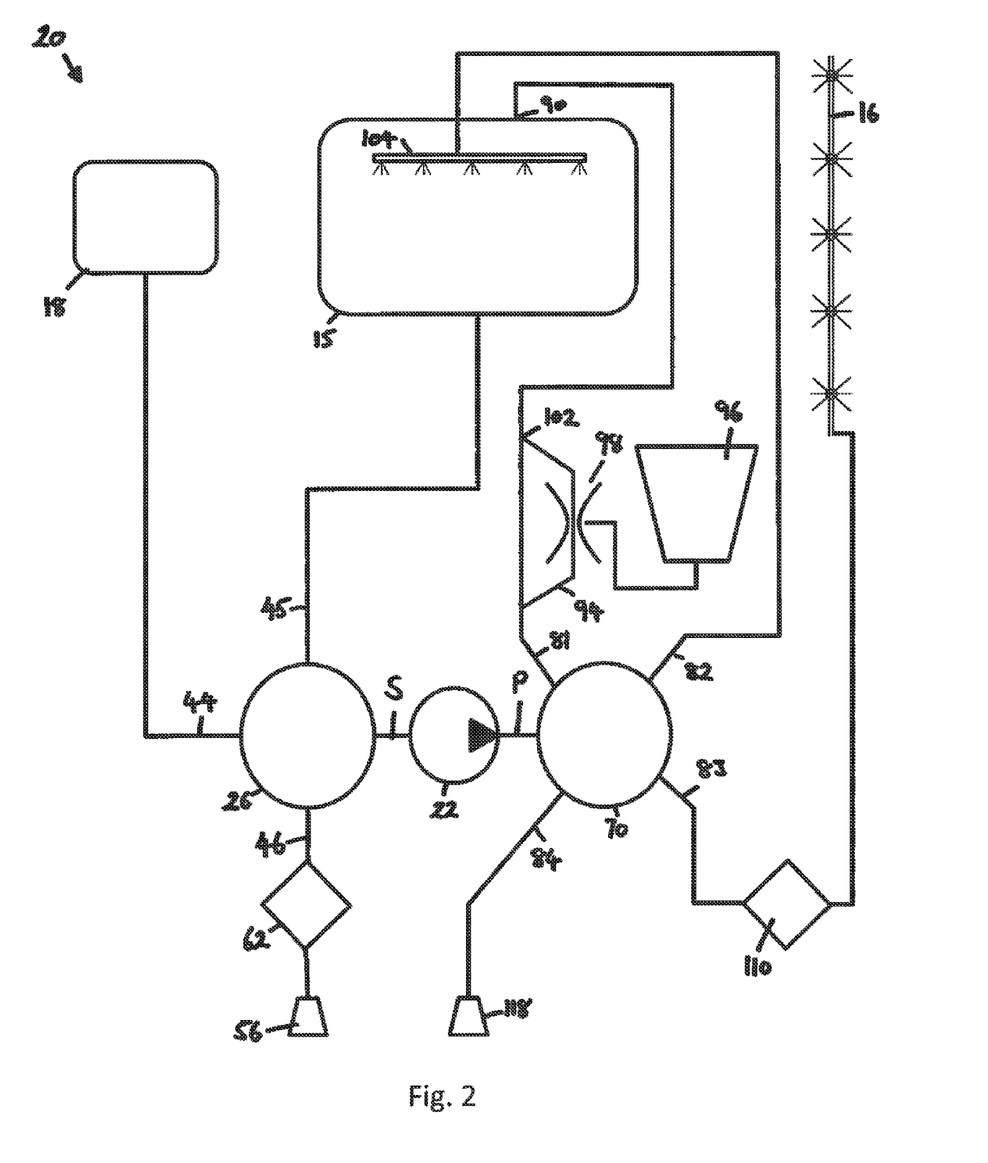
FIG. 2 is a diagrammatic fluid circuit of the pump system in accordance with the embodiment of the invention.
Figure 3:
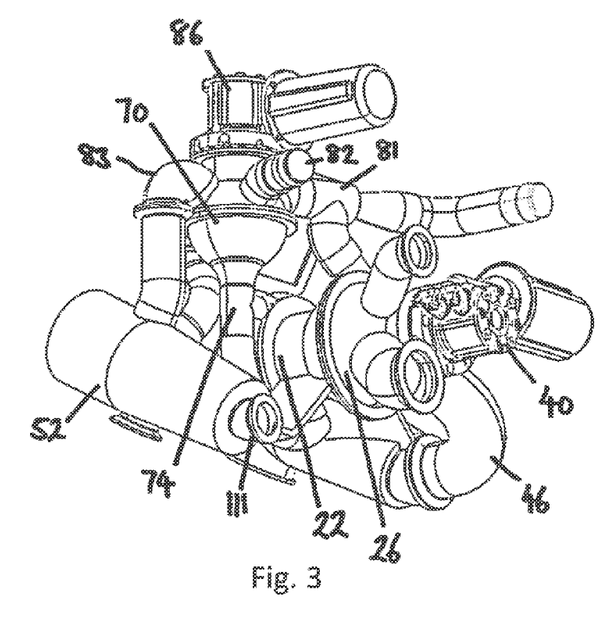
FIG. 3 is a rear lower right perspective view of a pump system in accordance with a first embodiment of the invention.
Figure 4:
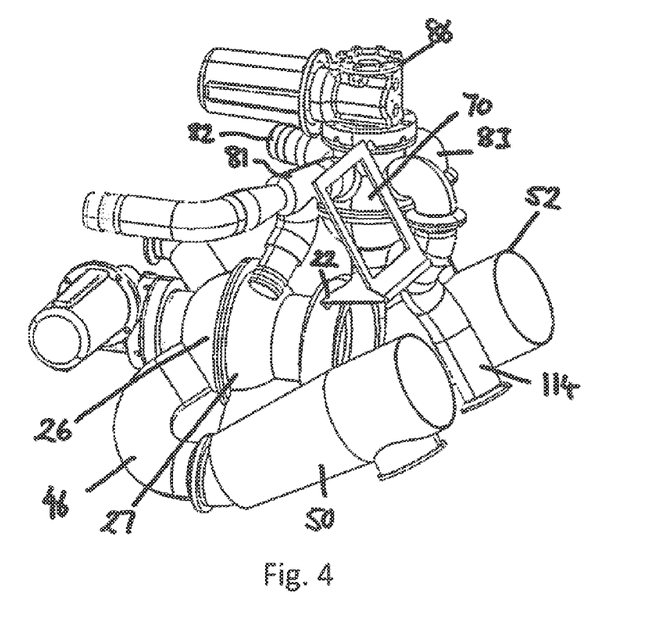
FIG. 4 is a front upper left perspective view of the pump system of FIG. 3.
Figure 11:
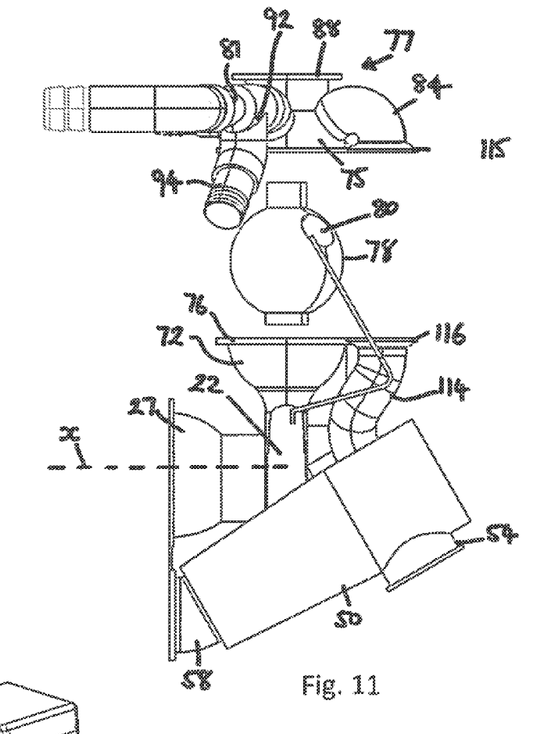
FIG. 11 is a front view of the pump system of FIG. 10 showing the pressure side ball valve in exploded form.

With reference to FIG. 2, a pump system 20 serves to convey and distribute fluid between the various fluid sources and consumers. With reference also to FIGS. 3 to 12, the pump system 20 comprises a centrifugal pump 22 having a suction side S and pressure side P. Centrifugal pump 22 comprises a casing 24 provided by a unitary casting 25 which is shown in isolation in FIGS. 5 and 6. Pump casing 24 encloses an impeller (not shown) that rotates on a pump axis X (FIG. 11). The impellor is driven by a motor (also not shown) mounted on the pump casing 24 opposite the suction side S. The motor may be hydraulic or electric. Furthermore, the motor may alternatively be mounted away from the pump 24 and connected mechanically by a belt and pulley system for example.

Figure 5:
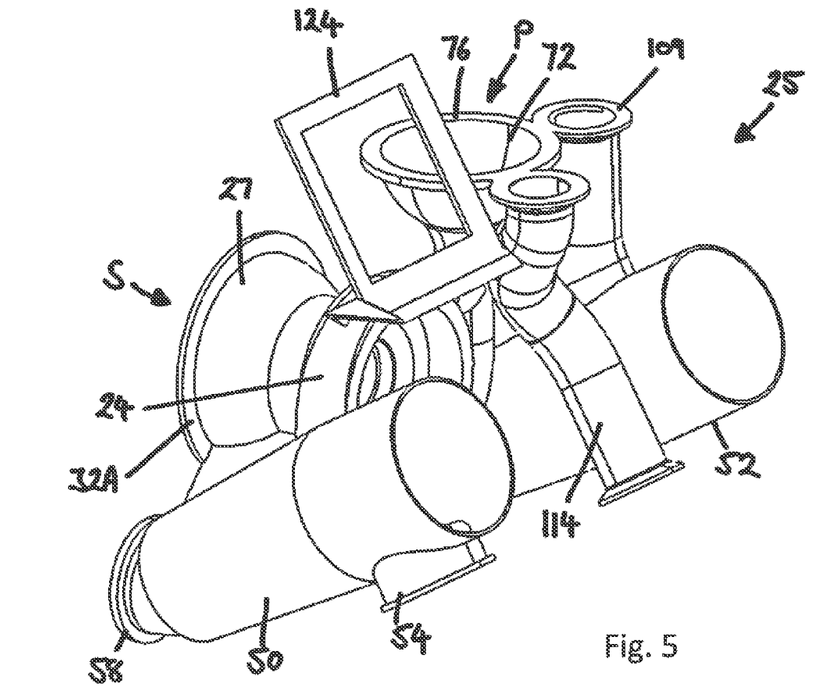
FIG. 5 is a front upper left view a unitary casting forming part of pump system of FIG. 3.
Figure 6:
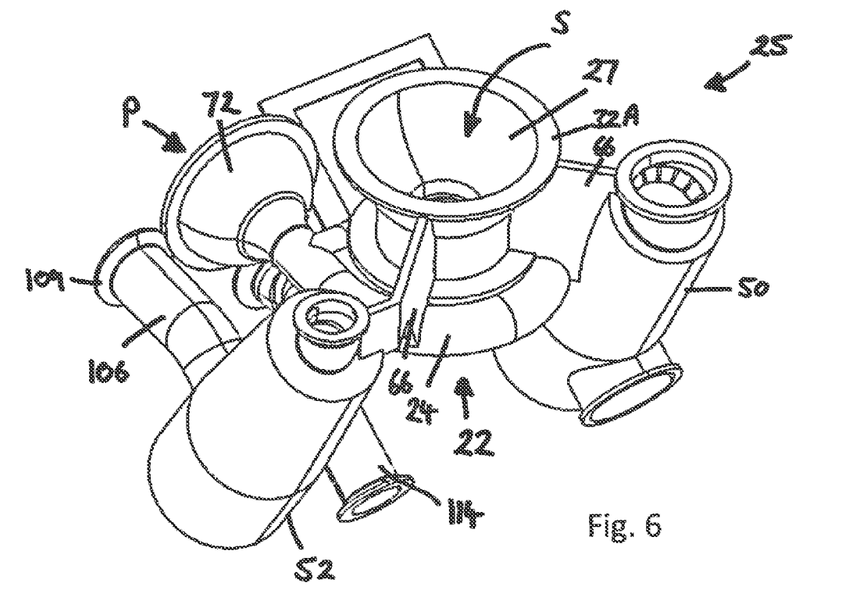
FIG. 6 is a rear lower right view of the unitary casting of FIG. 5.

With particular reference to FIGS. 5 and 6, fluid is drawn by pump 24 on suction side S along the pump axis and is ejected tangentially at pressure side P. The flow rate, as with any pump, can be varied by changing the speed of the impellor.

On the suction side of the pump 24 a 3-way ball valve 26 is provided to selectively connect one of three fluid sources to the suction side S of the pump 24. Suction side valve 26 includes a spherical casing formed in two portions 27,28. A first portion 27 is integrated into the unitary casting 25 as a semi-spherical receptacle. A second portion 28 is provided by a compound suction side manifold 30 shown in isolation in FIG. 7.

Figure 7:
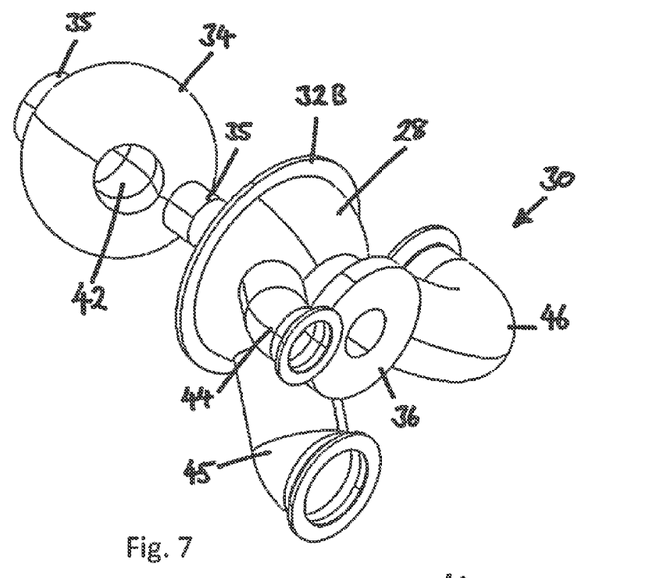
FIG. 7 is a rear upper right exploded perspective view of part of the pressure side ball valve.

First and second portions 27,28 sealingly mate around matching circular rims 32A,32B and provide a spherical casing to enclose spherical ball 34, best viewed in FIG. 7. Ball 34 includes opposing cylindrical pegs 35 each serving to engage in respective cylindrical recesses provided in the casing portions 27,28. Suction side manifold 30 includes an end hub 36 mounted on the outside of pump casing 28 and including a central aperture 38 giving access to the ball 34 of suction side valve 26. A simple electrical motor 40 is mounted on the exterior of hub 36 and serves to control rotation of the ball 34 between one of several positions.

Ball 34 includes a bore 42 having a dog-legged shape and which passes through the centre of the pump side peg 35. Rotation of ball 34 by motor 40 selectively connects the suction side S of pump 22 to one of three inlet pipes 44,45,46 cast into the suction side manifold 30.

A first one of the pipes 44 is plumbed to clean water tank 18. A second pipe 45 is plumbed to an outlet 48 of solution tank 15. A third, substantially U-shaped pipe 46, is connected directly to a suction side filter housing 50 which will be described in more detail below.

During assembly the suction side manifold 28 is mounted to the suction side S of unitary casting 25 together providing a suction side distribution valve 26 which is immediately upstream of centrifugal pump 22. The ball 34 of valve 26 rotates on pump axis X and delivers the fluid along the pump axis into the pump casing 24. Advantageously, the close proximity of valve 26 to centrifugal pump 24 provides improved fluid dynamics and an improved pump efficiency. Furthermore, additional plumbing between the valve 26 and pump 24 is avoided.

Figure 8:
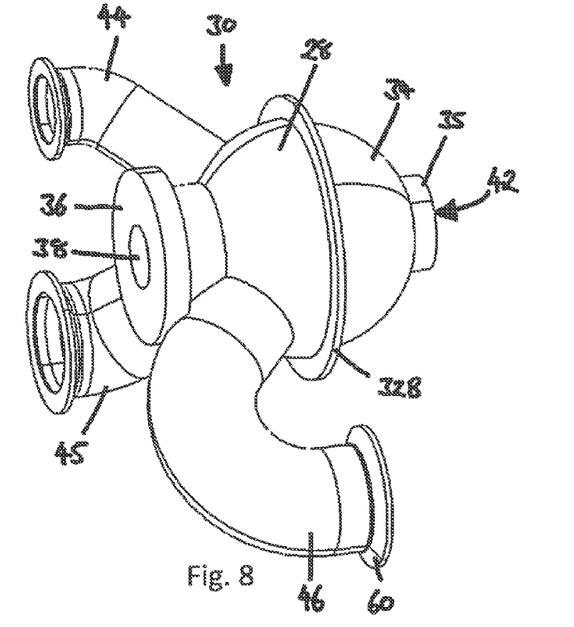
FIG. 8 is a front upper right perspective view of the pressure side ball valve included in the pump system of FIG. 3.
Figure 9:
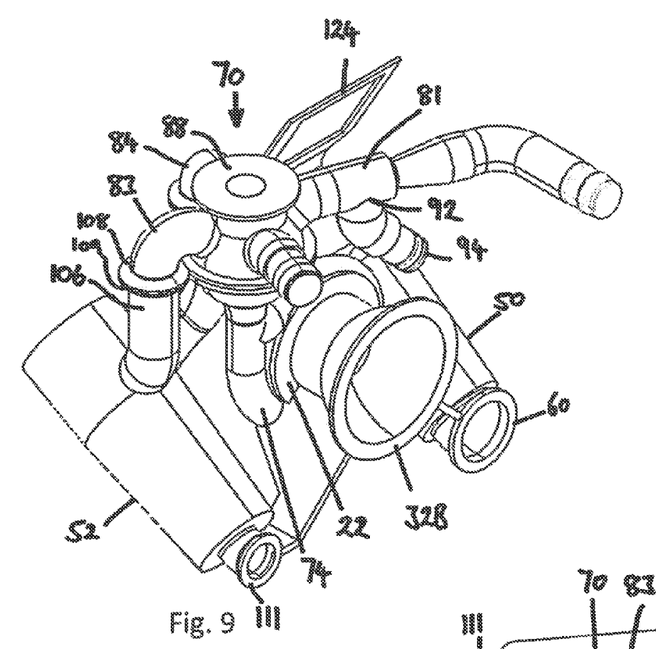
FIG. 9 is a rear upper right perspective view of part of the pump system of FIG. 3 shown with the suction side ball valve omitted.
Figure 10:
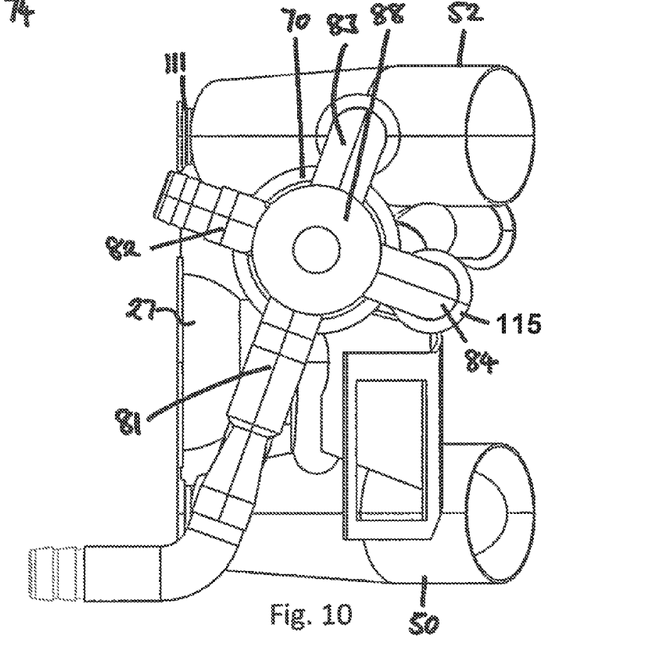
FIG. 10 is a plan view of the part of the pump system shown in FIG. 9.
Figure 12:
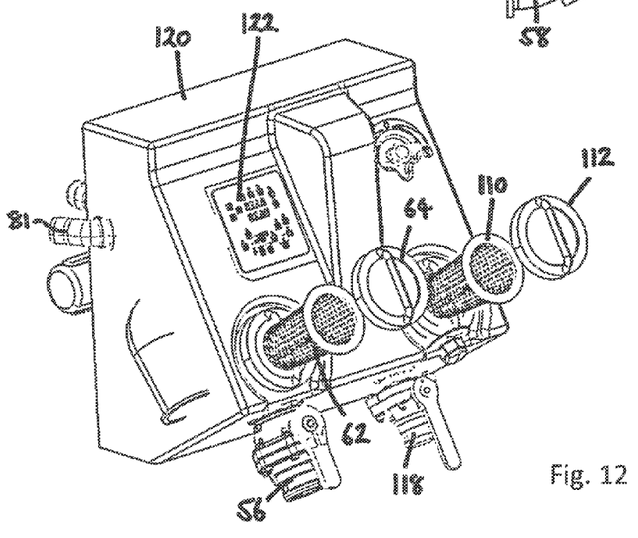
FIG. 12 is front upper left perspective view of the operator work station of the sprayer of FIG. 1.

Turning back to the unitary casting 25 shown in FIGS. 5 and 6, a suction side filter housing 50 and a pressure side filter housing 52 are included in the cast structure, one each side of the pump axis X. Suction side pump housing 50 includes at one end a radially-facing inlet flange 54 to which a manual, lever-operated, tap and coupling 56 are mounted. At the opposite end of housing 50 a substantially axially-aligned outlet flange 58 is provided for mating with a corresponding flange 60 provided on the end of pipe 46 (FIG. 8). The suction side filter housing 50 houses a replaceable filter 62 which is closed by a removable protective cap 64 (FIG. 12). Closable coupling 56 allows the operator to secure a hose to the sprayer 10 for filling main tank 15 or clean water tank 18. Pressure side filter housing 52 will be described in more detail below.

Figure 15:
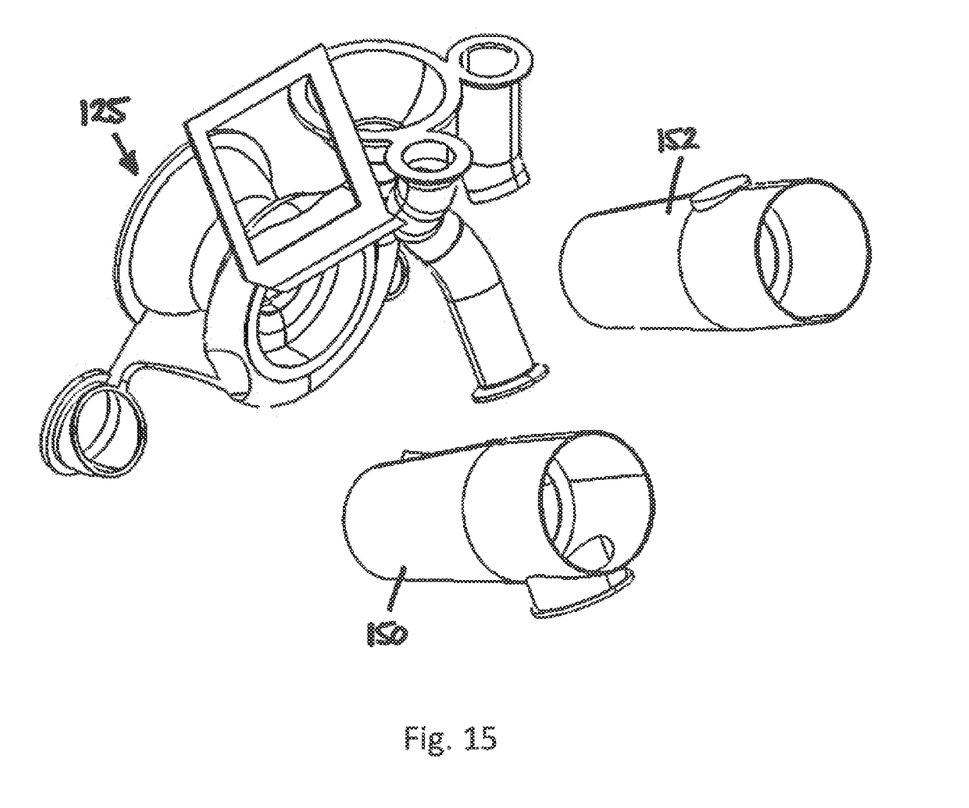

Both filter housings 50,52 are secured to the pump casing 24 by respective strengthening plates 66, best seen in FIG. 6 and cast into structure 25. Although shown as being integrated into the unitary casting 25, it is envisaged that filter housings 50,52 may instead be provided as separate components as illustrated in FIG. 15 in which the filter housings 150,152 are detachable from the casting 125.

Turning to the pressure side P, a pressure side distribution valve 70 is positioned immediately downstream (with respect to fluid flow) of the pump 24. Valve 70 is also of a ball valve type and is similar in construction to the suction side valve 26 described above. Casting 25 includes the bottom half 72 of spherical valve casing and a passage 74 providing a fluid connection to the output of pump 22. The top half 75 of the pressure side valve casing is formed as part of a pressure side manifold 77.

The bottom portion 72 and top portion 75 are sealed together around a mating rim 76. Inside the casing a ball 78 (with a dog-leg shaped passage 80) is housed for rotation so as to selectively connect the output of pump 22 to one of four outlet ports having corresponding pipes 81,82,83 and 84. An electric motor 86 (shown in FIGS. 3 and 4) is mounted to an end hub 88 which is cast into the pressure side manifold 77.

First pipe 81 is plumbed to an inlet 90 of solution tank 15. Downstream of valve 70 a junction 92 routes a portion of the conveyed fluid via a separate branch 94 and a chemical inductor 96. The chemical inductor 96 is a separate receptacle provided for an operator to add concentrated chemicals in a safe manner. A venturi valve 98 draws the chemical from the inductor 96 into the branch 94. The chemical-rich solution re-joins the main pipe 81 at junction 102 for injection into the main tank 15.

A second of the pressure side outlets 82 is plumbed to a rinse line which serves to rinse the main product tank 15 and terminates with a nozzle bar 104 located within the tank 15.

A third pressure side outlet 83 is connected directly to an inlet pipe 106 of the pressure side filter housing 52. Mating flanges 108,109 are provided on respective ends of the third outlet pipe 83 and filter housing inlet pipe 106 to provide a sealing connection when the pressure side manifold 77 is connected to the unitary casting 25. The pressure side filter housing 52 includes an outlet pipe 111 which extends substantially axially from a lower end and which serves for plumbing to the spray boom 16. The housing 52 accepts a replaceable filter 110 which is held in position by removable cap 112.

The fourth outlet pipe 84 is connected to a downwardly extending pipe 114 which may be integrated into the unitary casting 25. Mating flanges 115,116 provided on the fourth outlet pipe 84 and upper end of pipe 114 respectively are brought into a sealed connection when the pressure side manifold 77 is mounted to unitary casting 25.

At the lower end of pipe 114 a manual tap and coupling 118 is mounted so as to receive an interlocking connecting hose which can be attached/detached as required for emptying one or both of the tanks 15,18.

With reference to FIG. 12, an operator work station is provided around the compact pump system described above wherein a cover 120 houses the pump 22 and valves 26,70. The cover 120 includes access openings to the suction side filter housing 50 and pressure side filter housing 52 to allow ergonomic access for replacing the filters 62,110.

Furthermore, the suction side coupling 56 and pressure side coupling 118 extend from the cover 120 for easy reach when coupling hoses (not shown).

A user interface 122 which includes a display and/or control buttons is mounted to a display bracket 124 which is provided by the casting 25. The user interface panel is flush with the surface of cover 120 to provide a compact and ergonomic system.

Turning back to the unitary casting 25, by providing the casing of pump 24 and filter housings 50,52 in a single casting a significant cost reduction by reducing the number of parts is provided. Furthermore, the unitary casting 25 with multiple functions provides for a more compact pump system which simplifies assembly and maintenance.

Operation

Both the suction side valve 26 and pressure side valve 70 are controlled to selectively distribute fluid between the various sprayer components. During filling of the solution tank a hose may be coupled to suction side coupling 56 which supplies water via the filter 62 through the pump 22 and in to solution tank 15.

During a spraying operation, the suction side valve 26 connects the solution tank 15 to the pump 22 whereas the pressure side valve connects the pump 22 to the pressure side filter 110 and ultimately the boom 16.

Alternative Embodiment

Figure 13:
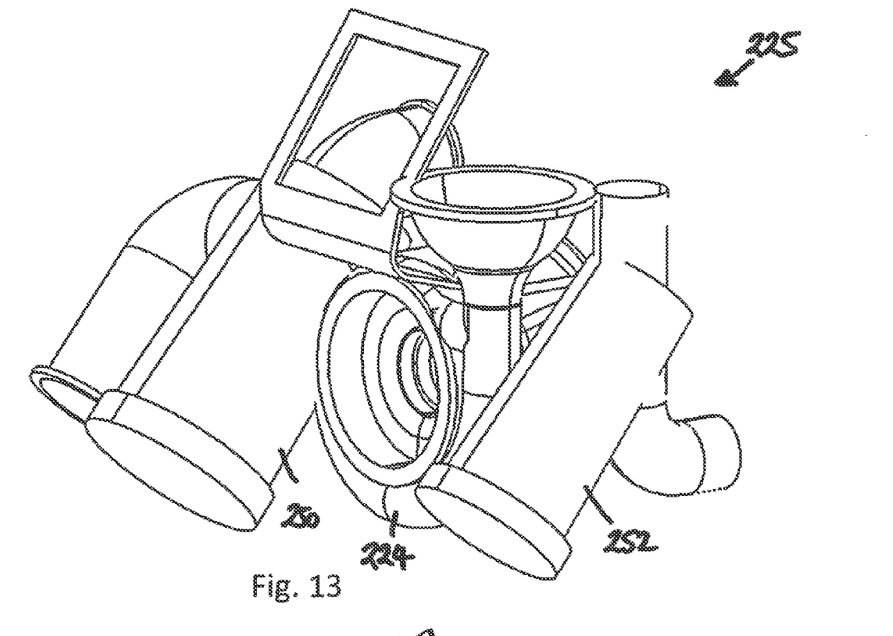
FIG. 13 is a rear left perspective view of part of a pump system in accordance with a second embodiment of the invention.
Figure 14:
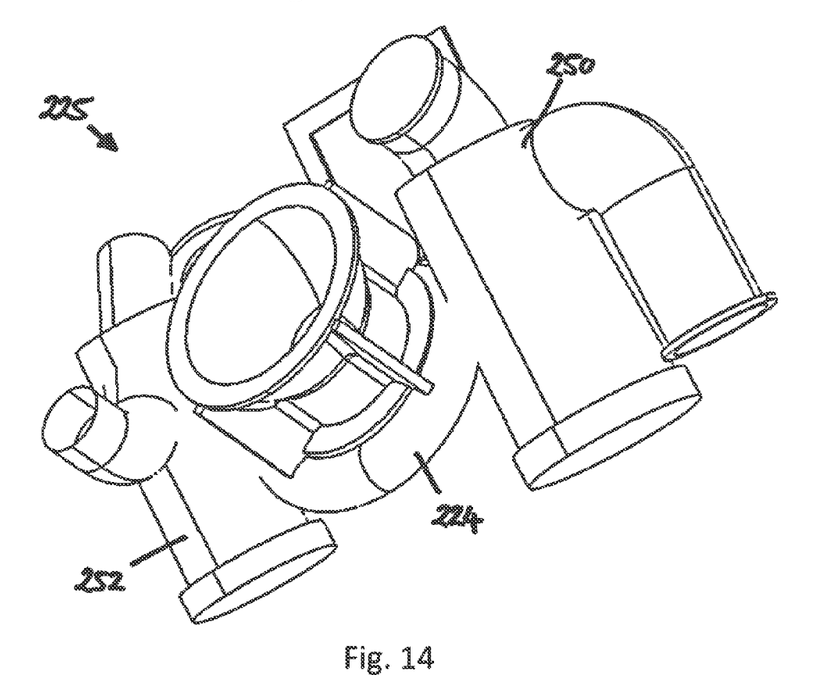
FIG. 14 is a front lower right perspective view of the pump system part shown in FIG. 13; and, FIG. 15 is an exploded front upper left perspective view of part of a pump system in accordance with a third embodiment of the invention.

With reference to FIGS. 13 and 14 an alternative embodiment is illustrated in which a unitary casting 225 includes a pump casing 224, a suction side filter housing 250 and a pressure side filter housing 252. In this example the substantially cylindrical filter housings 250,252 are angled downwardly.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

The invention claimed is:

1. An agricultural sprayer comprising a pump system for conveying and distributing fluid between fluid sources and consumers, the pump system comprising a centrifugal pump and a multi-inlet ball valve located on a suction side of the pump, the centrifugal pump comprising an impeller that rotates on a pump axis, the ball valve comprising a ball that is rotatable around the pump axis to selectively connect the valve inlets to the pump, wherein the pump comprises a pump casing that is provided together with a portion of a ball valve casing by a unitary casting.

2. An agricultural sprayer according to claim 1, wherein the pump system further comprises a suction side manifold in sealing connection with said portion of the ball valve casing, the suction side manifold providing a further portion of the ball valve casing and comprising a plurality of inlet tubes that correspond to the valve inlets and which align with a bore provided in the ball.

3. An agricultural sprayer according to claim 2, wherein the pump system comprises a filter housing mounted to the centrifugal pump, the filter housing having an inlet plumbed to a coupling device for attaching a filler hose, and an outlet plumbed to a first one of said plurality of inlet tubes of the suction side manifold.

4. An agricultural sprayer according to claim 3, comprising an operator workstation having a console that includes an access opening to the filter housing for the operator to replace a filter element.

5. An agricultural sprayer according to claim 2, further comprising a storage tank having an outlet plumbed to a second one of said plurality of inlet tubes of the suction side manifold.

6. An agricultural sprayer according to claim 5, further comprising a clean water tank having an outlet that is plumbed to a third one of said plurality of inlet tubes of the suction side manifold.

7. An agricultural sprayer according to claim 2, the pump system further comprising an electric actuator mounted on the suction side manifold and arranged to control rotation of the ball valve.

8. An agricultural sprayer according to claim 1, the pump system further comprising a multi-outlet ball valve located on a pressure side of the pump, the pressure-side ball valve comprising a ball that is rotatable to selectively connect the valve outlets to the pump, wherein the unitary casting includes a portion of a casing of the pressure-side ball valve.

9. An agricultural sprayer according to claim 8, wherein the pump system further comprises a pressure side manifold in sealing connection with said portion of the pressure-side ball valve casing, the pressure side manifold providing a further portion of the pressure side ball valve casing and comprising a plurality of outlet tubes that correspond to the valve outlets and which align with a bore provided in the ball.

10. An agricultural sprayer according to claim 9, wherein the pump system comprises a pressure side filter housing mounted to the centrifugal pump, the filter housing having an inlet plumbed to a first one of said plurality of outlet tubes of the pressure side manifold.

11. An agricultural sprayer according to claim 10, further comprising a plurality of fluid dispensing nozzles arranged on a boom and being plumbed to an outlet of the pressure side filter housing.

12. An agricultural sprayer according to claim 10, comprising an operator workstation having a console that includes an access opening to the pressure side filter housing for the operator to replace a filter element.

13. An agricultural sprayer according to claim 3, wherein the filter housing is included in the unitary casting.

14. A pump system for conveying and distributing fluid between fluid sources and consumers, the pump system comprising a centrifugal pump and a multi-inlet ball valve located on a suction side of the pump, the centrifugal pump comprising an impeller that rotates on a pump axis, the ball valve comprising a ball that is rotatable around the pump axis to selectively connect the valve inlets to the pump, wherein the pump comprises a pump casing that is provided together with a portion of a ball valve casing by a unitary casting.

15. A unitary casting comprising a centrifugal pump casing and a portion of a ball valve casing together defining a continuous first open-ended chamber, and a filter housing defining a second open-ended chamber isolated from the first chamber, the first chamber being suitable for housing an impellor on a rotation axis and comprising an axial inlet opening, a tangential outlet opening and an axial aperture for receiving an impellor driveshaft.

* * * * *